US012724206B2

(12) United States Patent
Ajersch et al.

(10) Patent No.: US 12,724,206 B2
(45) Date of Patent: Sep. 1, 2026

(54) CONVECTION COOLING OF A PLUGGABLE OPTICAL MODULE IN A PRINTED CIRCUIT BOARD ENVELOPE

(71) Applicant: Ciena Corporation, Hanover, MD (US)

(72) Inventors: Peter Ajersch, Ottawa (CA); Behzad Mohajer, Vancouver (CA)

(73) Assignee: Ciena Corporation, Hanover, MD (US)

(*) Notice: Subject to any disclaimer, the term of this patent is extended or adjusted under 35 U.S.C. 154(b) by 202 days.

(21) Appl. No.: 18/381,240

(22) Filed: Oct. 18, 2023

(65) Prior Publication Data

US 2025/0130372 A1 Apr. 24, 2025

(51) Int. Cl.
*G02B 6/38* (2006.01)

(52) U.S. Cl.
CPC .................................. *G02B 6/3814* (2013.01)

(58) Field of Classification Search
CPC .. G02B 6/3814; G02B 6/4268; G02B 6/4284; H05K 1/0274; H05K 2201/09063; H05K 2201/09072; H05K 2201/10121; H05K 1/0203; H05K 1/0272
See application file for complete search history.

(56) References Cited

U.S. PATENT DOCUMENTS 5,083,194 A 1/1992 Bartilson
6,729,905 B1 * 5/2004 Hwang ................ H05K 9/0058 439/607.21
6,866,544 B1 * 3/2005 Casey .................. H05K 9/0058 439/607.2
7,150,653 B1 * 12/2006 Mason ............... H01R 13/6582 439/607.18
7,234,880 B1 * 6/2007 Charny ................ G02B 6/4284 385/92
7,452,216 B2 * 11/2008 Murr .................... H01R 13/665 439/74
7,488,212 B2 * 2/2009 Chen .................... G02B 6/4277 439/541.5
8,534,930 B1 9/2013 Lima
9,980,411 B2 * 5/2018 Yang ......................... G06F 1/20
11,177,592 B2 * 11/2021 Scholeno ................. G02B 6/42

(Continued)

FOREIGN PATENT DOCUMENTS

CN 108366484 A * 8/2018 ............... H05K 1/18

OTHER PUBLICATIONS

Li Yi, “PCB and electronic equipment”, Aug. 3, 2018, H3C Holding LTD, Entire Document (Translation of CN 108366484). (Year: 2018).*

(Continued)

*Primary Examiner* — Stephen S Sul
(74) *Attorney, Agent, or Firm* — Clements Bernard Walker; Christopher L. Bernard

(57) ABSTRACT

A convection cooling assembly for a pluggable optical module (POM), the convection cooling assembly including: a printed circuit board (PCB) assembly; and a POM cage coupled to the PCB assembly and adapted to receive a POM adjacent to the PCB assembly; where the PCB assembly defines a cutout or a recess within the POM cage and adapted to be disposed adjacent to a surface of the POM when the POM is received within the POM cage. The cutout or the recess includes a main channel and one or more side channels disposed orthogonal or at an angle to the main channel.

18 Claims, 19 Drawing Sheets

(56) References Cited

U.S. PATENT DOCUMENTS

| | | | | |
|---|---|---|---|---|
| 11,536,918 | B2 | 12/2022 | Zbinden et al. | |
| 2015/0124404 | A1 | 5/2015 | Shen et al. | |
| 2018/0054021 | A1* | 2/2018 | Regnier | H01R 13/533 |
| 2019/0115684 | A1 | 4/2019 | Khazen et al. | |
| 2020/0076455 | A1 | 3/2020 | Sharf | |
| 2022/0003946 | A1* | 1/2022 | Edwards, Jr. | G02B 6/4268 |

OTHER PUBLICATIONS

International Search Report issued in corresponding PCT Application No. PCT/US2024/051316.

* cited by examiner

CONVECTION COOLING OF A PLUGGABLE OPTICAL MODULE IN A PRINTED CIRCUIT BOARD ENVELOPE

TECHNICAL FIELD

The present disclosure relates generally to the telecommunications and networking fields. More particularly, the present disclosure relates to the convection cooling of a pluggable optical module (POM) in the printed circuit board (PCB) envelope adjacent to the POM.

BACKGROUND

POMs are typically cooled via several conventional thermal paths. The POM case top is typically in contact with a heat sink (or cold plate), which may be air or liquid-cooled. Design efforts are dedicated to minimizing the contact resistance between the POM case top and the heat sink (or cold plate). The heat sink (or cold plate) temperature depends on system design choices; e.g. fin pitch, air speed, etc. The POM case bottom may be thermally coupled to the adjacent PCB by virtue of its proximity to the PCB and the narrow air gap between the POM case bottom and the PCB. While this is typically not a low-resistance thermal interface, it is a useful secondary thermal path. The POM case bottom may optionally be cooled by a heat sink (or cold plate) that is in surface-to-surface contact, similar to the POM case top heat sink (or cold plate). This strategy entails designing an opening in the PCB under the POM so that the heat sink (or cold plate) on the far side of the PCB can reach through the PCB to make contact with the POM case bottom. The "nose" of the POM is typically cooled by the surrounding air, and POMs often have fins designed in the nose to improve the convective heat transfer between the nose and the surrounding air. This thermal path is more effective when the system airflow is front-to-back; i.e. the dominant airflow direction is from the region in front of the POM (i.e. the end with the optical fiber or cable connections) to the region at the rear of the POM (i.e. the end with the PCB electrical connector). This thermal path has limited value when the system airflow is side-to-side; i.e. the POM mounts to a circuit card, or blade, whereby the system airflow is from side A to side B of the POM. The nose of the POM may optionally be cooled with a graphite-over-foam (GOF) (or similar) thermal bridge between the nose and the relatively cold faceplate.

In arrangements whereby POMs are arranged belly-to-belly on the primary and secondary sides of a PCB (e.g. in a 1 U 32-POM pizza box server design), secondary side cooling of the POM is severely limited, if not impossible. Without secondary-side cooling, thermal limits are reached sooner, and the maximum power (present and future) plug that can be supported by a given system will be less. Less power is associated with lower data rate, lower Gbaud, less reach, less forward error correction (FEC), etc.

The present background is provided as illustrative environmental context only and should not be construed to be limiting in any manner. It will be readily apparent to those of ordinary skill in the art that the principles and concepts of the present disclosure may be implemented in other environmental contexts equally.

BRIEF SUMMARY

The present disclosure provides an arrangement of POMs that are positioned belly-to-belly on the primary and secondary sides of a PCB, with secondary-side cooling enabled by selectively removing a volume of the PCB, such that an airflow channel is created under the POM with sufficiently low hydraulic resistance that the channel airflow rate is useful for convectively cooling the POM case bottom. Cuts are made in the faceplate to enable the primarily front-to-back airflow channel. Optional cuts may be made in the POM cage to further improve (i.e. reduce the hydraulic resistance of) the airflow path. With a primarily front-to-rear airflow path provided under the POM, there are different ways to utilize the airflow to convectively cool the POM case bottom. Using a heat sink to bear against a hot surface in the presence of colder moving air is conventional, but through the present disclosure a space exists within the envelope (i.e., thickness) of the PCB (that would otherwise be solid). A jet impingement device may be disposed within this envelope (that would otherwise be solid) to further cool the hot surfaces. This arrangement is especially useful where secondary-side POMs are typically cooled less than primary-side POMs. By enhancing the total cooling of the secondary side POMs, the secondary side POMs become less of a limiting device in the system. Through thermal simulation, it has been determined that at certain ambient conditions and fan speeds (e.g. 40° C. ambient and 40% max fan speed), 4 W of heat can be removed from the POM case bottom, which is associated with a 3-5° C. reduction in POM temperature. This level of reduction is considered significant in the context of POM cooling and presents a competitive advantage. Thus, higher power POMs can be cooled effectively, and liquid-cooling methodologies can be delayed, etc.

As described in greater detail below, the principles and concepts of the present disclosure may be utilized with PCB primary-side POMs, secondary-side POMs, and belly-to-belly POMs arranged vertically top-and-bottom or horizontally side-by-side. The envelope created in the PCB may be a primary-side or secondary-side recess, or may be formed completely through the PCB.

In one embodiment, the present disclosure provides a convection cooling assembly for a POM, the convection cooling assembly including: a PCB assembly; and a POM cage coupled to the PCB assembly and adapted to receive a POM adjacent to the PCB assembly; where the PCB assembly defines a cutout or a recess within the POM cage footprint and adapted to be disposed adjacent to a surface of the POM when the POM is received within the POM cage. The cutout or the recess includes a main channel and one or more side channels disposed orthogonal or at an angle to the main channel. Optionally, the POM cage defines one or more side openings aligned with the one or more side channels. The PCB assembly includes a PCB body and the PCB body defines the cutout or the recess. Alternatively, the PCB assembly includes a PCB body and a coplanar insert and the coplanar insert defines the cutout or the recess. The convection cooling assembly also includes a faceplate disposed orthogonal to the PCB assembly and defining an opening aligned with the cutout or the recess. Optionally, the convection cooling assembly further includes a jet impingement device disposed within the cutout or the recess and adapted to receive an airflow through the opening defined by the faceplate and direct the airflow to the surface of the POM. In one embodiment, the POM cage is coupled to a primary side of the PCB assembly; and the PCB assembly defines the cutout or a primary-side recess within the POM cage and adapted to be disposed adjacent to the surface of the POM when the POM is received within the POM cage on the primary side of the PCB assembly. In another embodiment, the POM cage is coupled to a secondary side of the PCB assembly; and the PCB assembly defines the cutout or a secondary-side recess within the POM cage and adapted to be disposed adjacent to the surface of the POM when the POM is received within the POM cage on the secondary side of the PCB assembly. In a further embodiment, the POM cage coupled to the PCB assembly and adapted to receive the POM adjacent to the PCB assembly includes a primary-side POM cage coupled to a primary side of the PCB assembly and adapted to receive the primary-side POM adjacent to the primary side of the PCB assembly and a secondary-side POM cage coupled to a secondary side of the PCB assembly and adapted to receive the secondary-side POM adjacent to the secondary side of the PCB assembly; and the cutout or a recess includes a cutout through the PCB assembly within the primary-side POM cage and the secondary-side POM cage or a recess formed in the primary side of the PCB assembly within the primary-side POM cage and a recess formed in the secondary side of the PCB assembly within the secondary-side POM cage.

In another embodiment, the present disclosure provides a network element including: a POM; a faceplate; a PCB assembly disposed orthogonal to the faceplate; and a POM cage coupled to the PCB assembly and adapted to receive the POM adjacent to the PCB assembly; where the PCB assembly defines a cutout or a recess within the POM cage and adapted to be disposed adjacent to a surface of the POM when the POM is received within the POM cage; and where the faceplate defines an opening aligned with the cutout or the recess. The cutout or the recess includes a main channel and one or more side channels disposed orthogonal or at an angle to the main channel. Optionally, the POM cage defines one or more side openings aligned with the one or more side channels. The PCB assembly includes a PCB body and the PCB body defines the cutout or the recess. Alternatively, the PCB assembly includes a PCB body and a coplanar insert and the coplanar insert defines the cutout or the recess. The network element also includes a jet impingement device disposed within the cutout or the recess and adapted to receive an airflow through the opening defined by the faceplate and direct the airflow to the surface of the POM. In one embodiment, the POM cage is coupled to a primary side of the PCB assembly; and the PCB assembly defines the cutout or a primary-side recess within the POM cage and adapted to be disposed adjacent to the surface of the POM when the POM is received within the POM cage on the primary side of the PCB assembly. In another embodiment, the POM cage is coupled to a secondary side of the PCB assembly; and the PCB assembly defines the cutout or a secondary-side recess within the POM cage and adapted to be disposed adjacent to the surface of the POM when the POM is received within the POM cage on the secondary side of the PCB assembly. In a further embodiment, the POM cage coupled to the PCB assembly and adapted to receive the POM adjacent to the PCB assembly includes a primary-side POM cage coupled to a primary side of the PCB assembly and adapted to receive the primary-side POM adjacent to the primary side of the PCB assembly and a secondary-side POM cage coupled to a secondary side of the PCB assembly and adapted to receive the secondary-side POM adjacent to the secondary side of the PCB assembly; and the cutout or a recess includes a cutout through the PCB assembly within the primary-side POM cage and the secondary-side POM cage or a recess formed in the primary side of the PCB assembly within the primary-side POM cage and a recess formed in the secondary side of the PCB assembly within the secondary-side POM cage.

In a further embodiment, the present disclosure provides a method for providing a convection cooling assembly for a POM, the method including: providing a PCB assembly; coupling a POM cage to the PCB assembly, where the POM cage is adapted to receive a POM adjacent to the PCB assembly; and forming a cutout or a recess in the PCB assembly within the POM cage, where the cutout or the recess is adapted to be disposed adjacent to a surface of the POM when the POM is received within the POM cage.

It will be readily apparent to those of ordinary skill in the art that aspects and features of each of the described embodiments may be incorporated, omitted, and/or combined as desired in a given application, without limitation.

BRIEF DESCRIPTION OF THE DRAWINGS

The present disclosure is illustrated and described with reference to the various drawings, in which like reference numbers are used to denote like assembly components/method steps, as appropriate, and in which.

Figure 1:
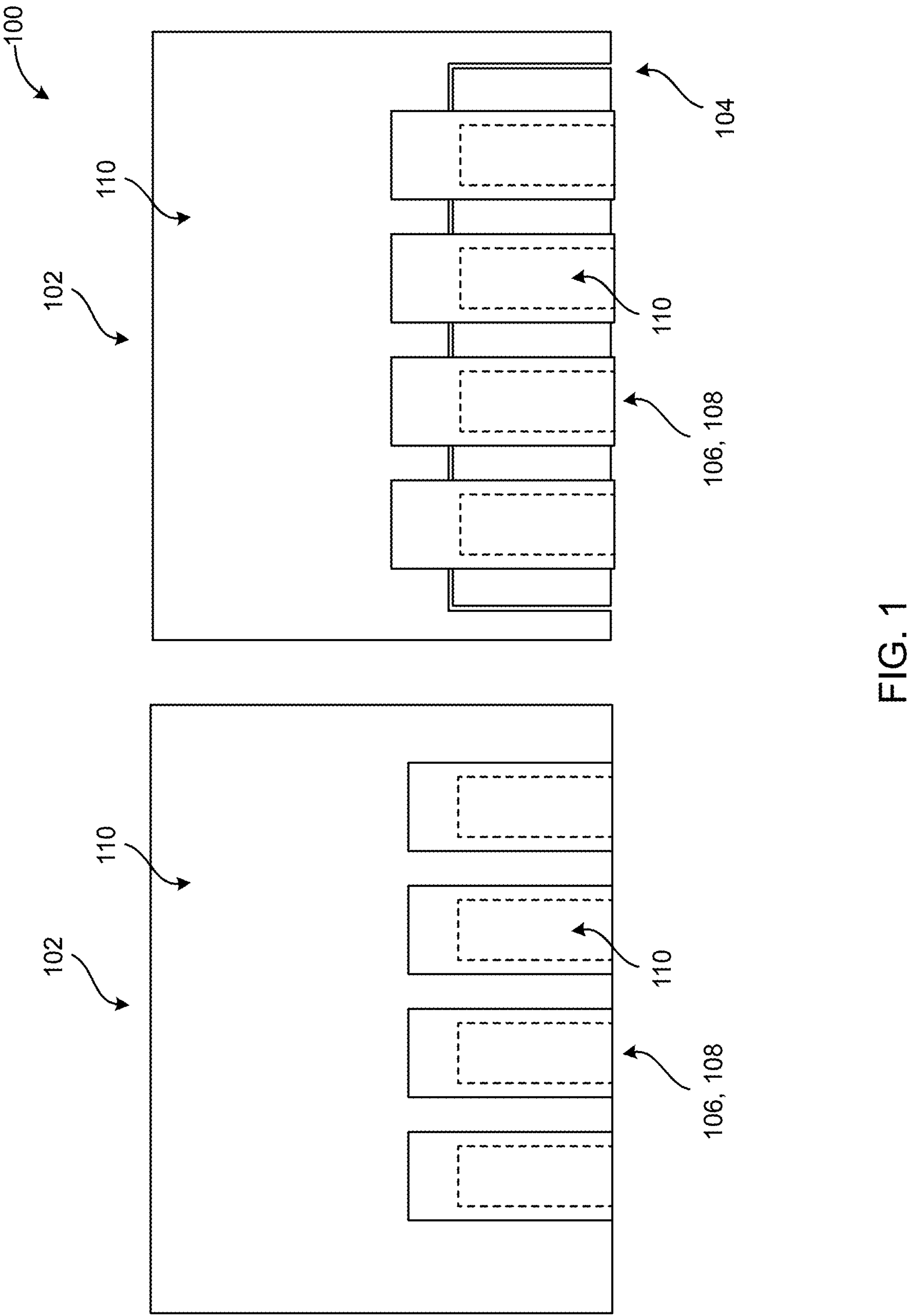
FIG. 1 shows two embodiments of the POM convection cooling assembly of the present disclosure, with envelopes formed adjacent to the POM case bottoms either as recesses in or cutouts through the PCB or an insert surrounded by the PCB.

It will be readily apparent to those of ordinary skill in the art that aspects and features of each of the illustrated embodiments may be incorporated, omitted, and/or combined as desired in a given application, without limitation.

DETAILED DESCRIPTION

In accordance with the present disclosure, the bottom side of a POM (e.g. a QSFP-DD) is cooled via convective heat transfer that is enabled by strategically removing a volume of PCB directly under and adjacent to the POM within the POM cage, such that a new airflow channel is created through the PCB. This method applies to, and is well suited to, systems in which POMs are arranged in an array on both the primary and secondary sides of the PCB, for example, and the forced-air cooling is in a front-to-rear direction. An example of such a system is a 1-rack-unit (1 U) server with an array of 32 POMs. As used herein, the "bottom" surface of the POM refers to the surface of the POM that is adjacent to the PCB, regardless of whether or not it is actually a "top" surface in an absolute sense or a "side" surface in a vertical shelf arranged. Such directionality references should not be construed as being limiting in any manner.

The removed PCB material allows for significant airflow under the POM because of the strong front-to-rear pressure gradient that exists between the region outside the equipment and the region just behind the equipment faceplate. The PCB material is removed during the PCB fabrication process by conventional manufacturing techniques; e.g. milling. It is assumed that there are no PCB traces in the cutout area. The channel is constructed such that channel airflow resistances are minimized. The geometry of the channel is such that a common channel is created in the front-to-rear direction under the POM, and one or multiple exit channels are cut in the PCB volume between the POM cage pins.

Openings are cut into the faceplate in the region between primary and secondary-side POMs directly in front of the PCB.

The entirety of the openings noted above allow for a significant airflow path from the relatively high-pressure region in front of the faceplate to the negative-pressure region behind the faceplate, in particular adjacent to the exit channels noted above.

The present disclosure assumes that the POM cage bottom has a bottom-side opening; e.g. a large rectangular opening; which enables the POM case bottom to face the newly created open channel. Such an opening is known to be feasible. The POM cage may also include features; e.g. new cutouts; to further reduce the hydraulic resistance of the primarily front-to-rear airflow path.

In the newly formed channel, convection heat transfer from the POM case bottom is enhanced by one of the following means. A heat sink resides in the channel with bearing pressure against the POM case bottom. The heat sink may be fabricated by normal methods, including machining, casting, skiving, folded fins, zipper fins, etc. A jet, or jet array, is created by forming a dividing wall between high-pressure and low-pressure sides of the channel, and nozzles are used to generate impingement airflow against the POM case bottom. This part can be made as a low-cost plastic molded part, or any reasonable form of fabrication, including 3D printing. Various jet arrangements are possible.

A temperature benefit is achieved even with the use of an empty channel, as the air movement against the POM case bottom suffices to carry some amount of heat away from the POM. With standard milling techniques, the channel geometry need not be rectangular, and need not be cut all the way through the PCB. A wide variety of channel sizes and shapes are possible and are effective to a degree without adding the complexity of the jet plate or heat sink. The heat sink is secured in the channel and pushed against the POM case bottom by means of a leaf spring, not unlike the conventional method for attaching a heat sink against the case top, but with a geometry that is adapted to the channel cavity. The jet plate is secured in the channel with a snap fit into one of more PCB detents, or with an interference fit.

FIG. 1 shows two embodiments of the POM convection cooling assembly 100 of the present disclosure, with envelopes formed adjacent to the POM case bottoms either as recesses in or cutouts through the PCB 102 or an insert 104 surrounded by the PCB 102. As illustrated, the PCB 102 may be a unitary body through/in which the cutouts or recesses are formed or may include the insert 104 manufactured from a different material, such as a plastic material or the like, through/in which the cutouts or recesses are formed. The POMs 106 and POM cages 108 are disposed on the PCB 102 and/or the insert 104, substantially coinciding with the locations of the cutouts or recesses. As alluded to above, the bottom surfaces of the POM cages 108 adjacent to the surface 110 (primary or secondary) of the PCB 102 or insert 104 are open or include an opening such that the bottom surfaces of the POMs 106 are exposed to the cutouts or recesses.

Figure 2:
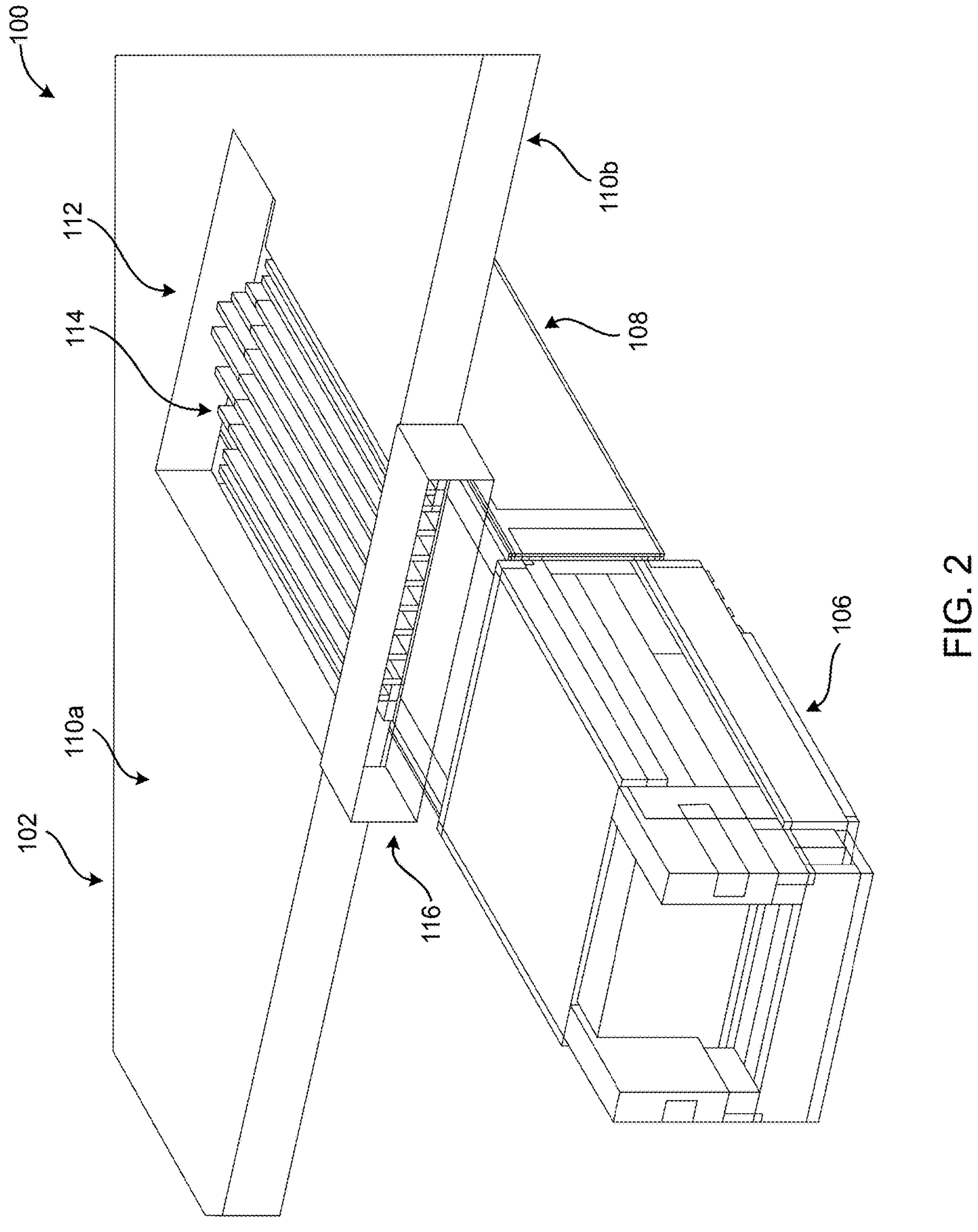
FIG. 2 shows a faceplate opening of the POM convection cooling assembly of the present disclosure, with an envelope formed adjacent to the POM case bottom as a cutout through the PCB, the POM case bottom incorporating a finned heat sink.

FIG. 2 shows a faceplate opening 116 of the POM convection cooling assembly 100 of the present disclosure, with an envelope formed adjacent to the POM case bottom as a cutout 112 through the PCB 102, the POM case bottom incorporating a finned heat sink 114. It should be noted that the faceplate opening 116 is open to a front faceplate edge of the PCB 102 and may be a sleeve that constrains the air path between the hidden faceplate and the front edge/surface of the PCB 102. Typically, there is some clearance between the faceplate and the front edge of the PCB 102, and if no such sleeve is added, some air may fail to enter the channel formed by the PCB cutout 112. The sleeve may be provided as a separate part between the faceplate and the PCB 102, or it may be formed as a local extension or protrusion of the faceplate. In effect, the air path from outside the faceplate is completely controlled, all the way to where it leaves the channel formed by the PCB cutout 112. In this embodiment, the POM 106 and POM cage 108 are disposed on the secondary surface 110*b* of the PCB 102 coincident with the cutout 112 formed through the PCB 102. The bottom surface of the POM 106 includes the finned heat sink 114 that is disposed within the cutout 112 when the POM 106 is disposed within the POM cage 108. In this manner, the finned heat sink 114 is disposed to a front-to-back airflow drawn into and through the cutout 112 through the faceplate opening 116, thereby enhancing the effectiveness of the finned heat sink 114. It will be readily apparent to those of ordinary skill in the art that a similar arrangement can be used for a POM 106 and POM cage 108 on the primary surface 110*a* of the PCB 102 as well, taking advantage of the same cutout 112. In such a case, the finned heat sinks 114 should be configured such that they do not interfere with each other in the cutout 112.

Figure 3:
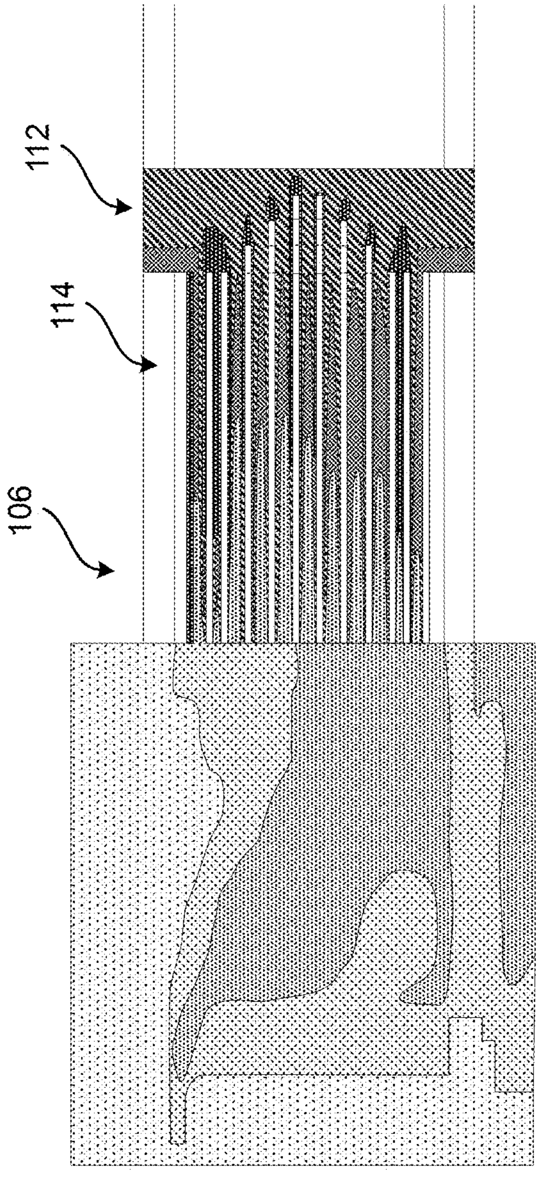
FIG. 3 shows a simulated temperature map showing how channel airflow picks up heat from the POM.

FIG. 3 shows a simulated temperature map showing how channel airflow picks up heat from the POM 106.

Figure 4:
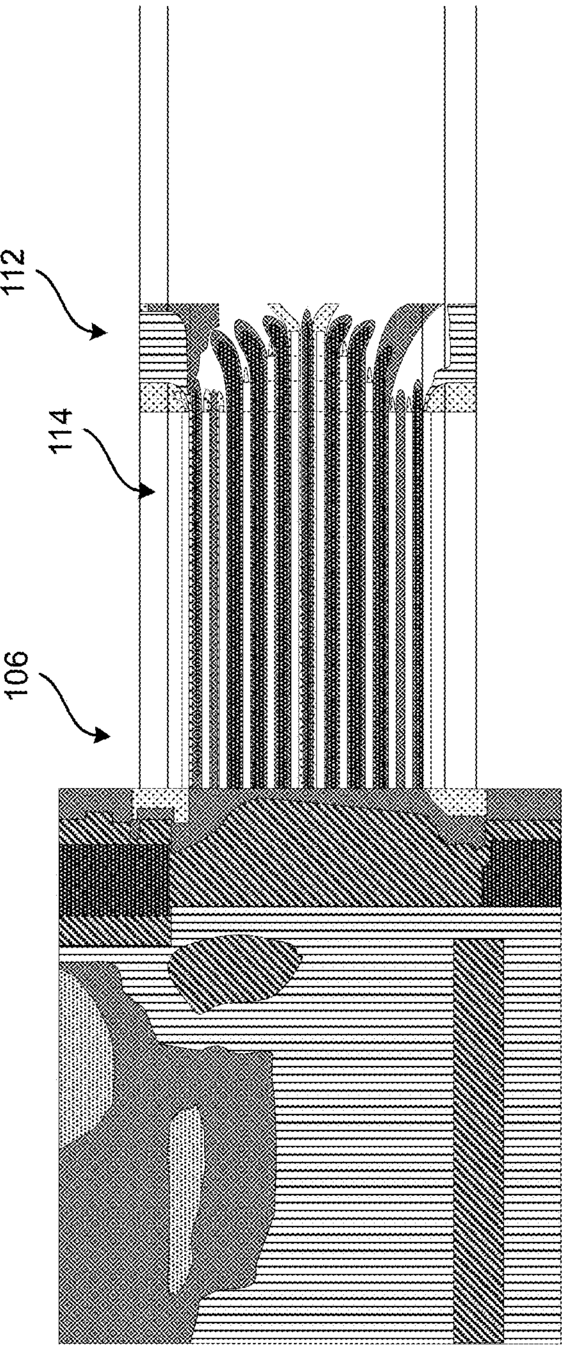
FIG. 4 shows a simulated speed map showing airflow in the channel and by the finned heat sink.

FIG. 4 shows a simulated speed map showing airflow in the channel 112 and by the finned heat sink 114.

Figure 5:
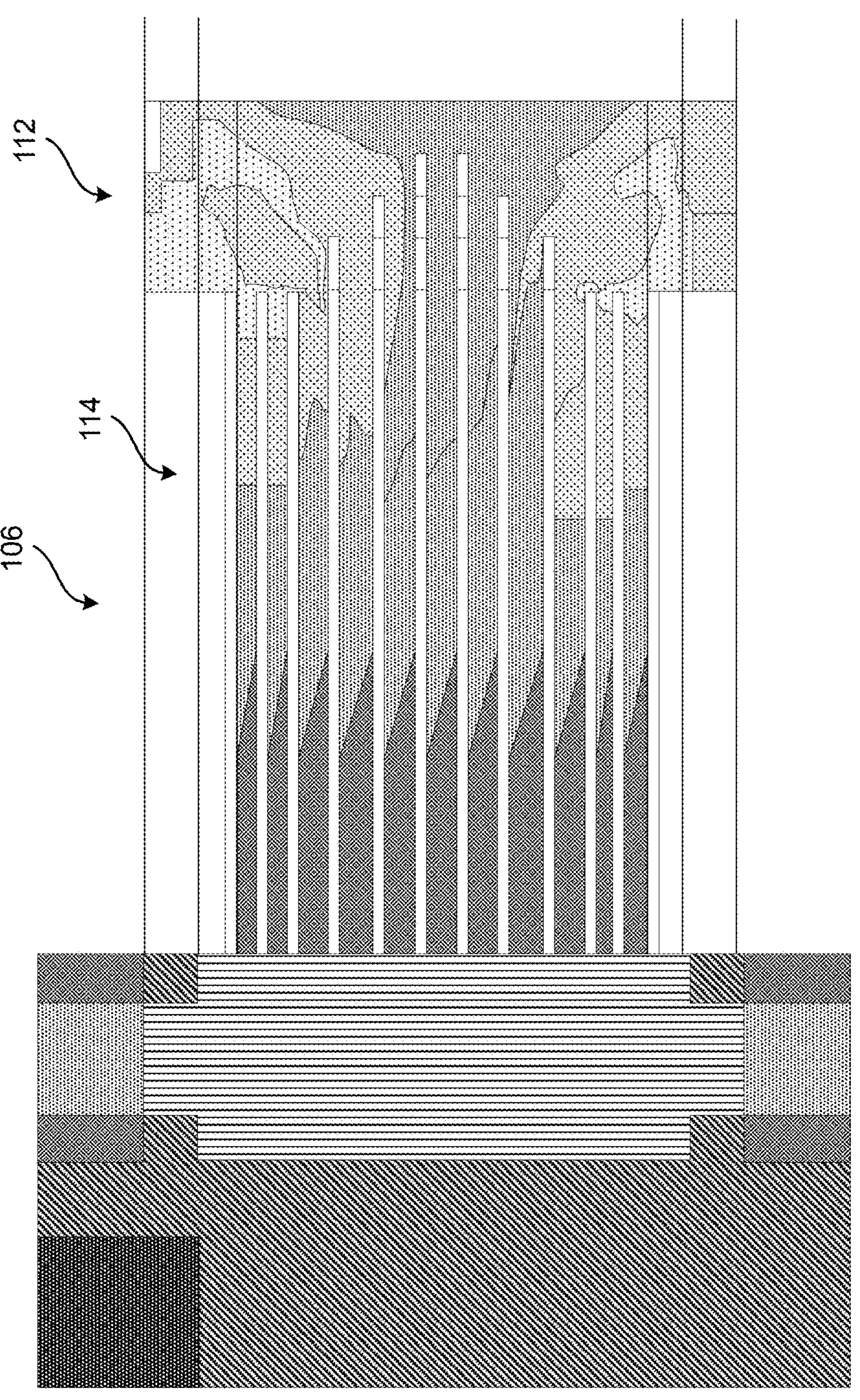
FIG. 5 shows a simulated pressure map showing pressure gradient in the channel that drives airflow by the finned heat sink.

FIG. 5 shows a simulated pressure map showing pressure gradient in the channel 112 that drives airflow by the finned heat sink 114.

Figure 6:
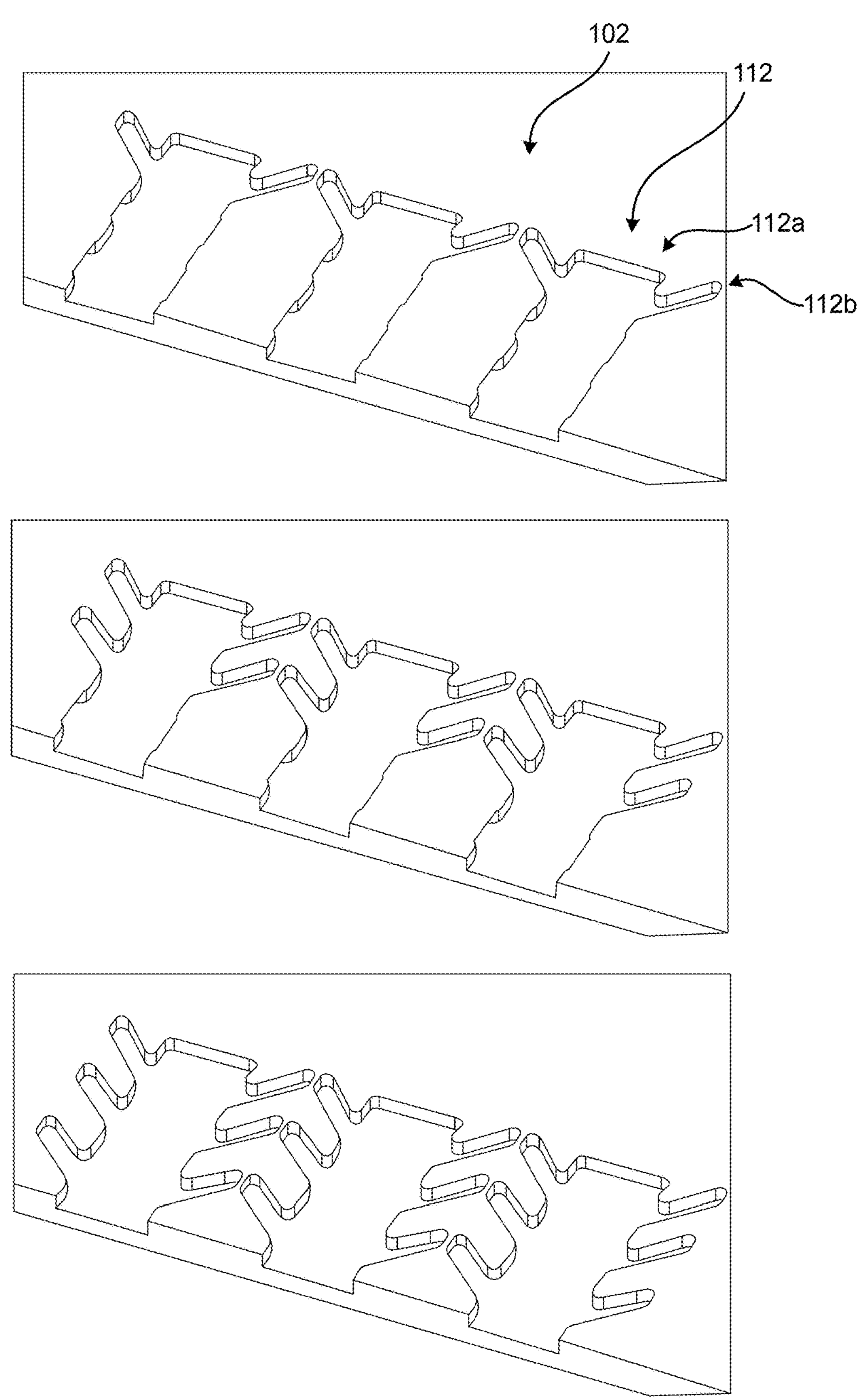
FIG. 6 shows three embodiments of the recessed PCB of the POM convection cooling assembly of the present disclosure.

FIG. 6 shows three embodiments of the recessed PCB 102 of the POM convection cooling assembly 100 of the present disclosure. As illustrated, the recess 112 includes a main channel 112*a* and one or more side channels 112*b* disposed orthogonal or at an angle to the main channel 112*a*. The main channel 112*a*, which is substantially rectangular, is wider than the side channels 112*b* which may have a tapering or radiused terminating end. The main channel 112*a* may have the same depth as the side channels 112*b*, or may be deeper than the side channel 112*b*. The milling depth used depends on the convection heat transfer objectives. In one embodiment, the side channels 112*b* are disposed close to the back of the main channel 112*a*, such that all airflow is first routed through the main channel 112*a* and then through the side channels 112*b*. In other embodiment, alternative or additional side channels 112*b* may be provided along the front-to-back length of the main channel 112*a*. In general, the locations of the side channels 112*b* may be chosen to be between pin locations wherein the POM cage 108 intersects the PCB 102. It will be readily apparent to those of ordinary skill in the art that a similar configuration may be used with a cutout 112 that goes completely through the PCB 102. Utilizing more side channels 112*b* may provide less total resistance and more total airflow, but the volume airflow may be biased to more frontal side channels 112*b*. Utilizing fewer rear-biased side channels 112*b* may provide less total airflow, but the entire volume airflow may passed over the entire case bottom.

Figure 7:
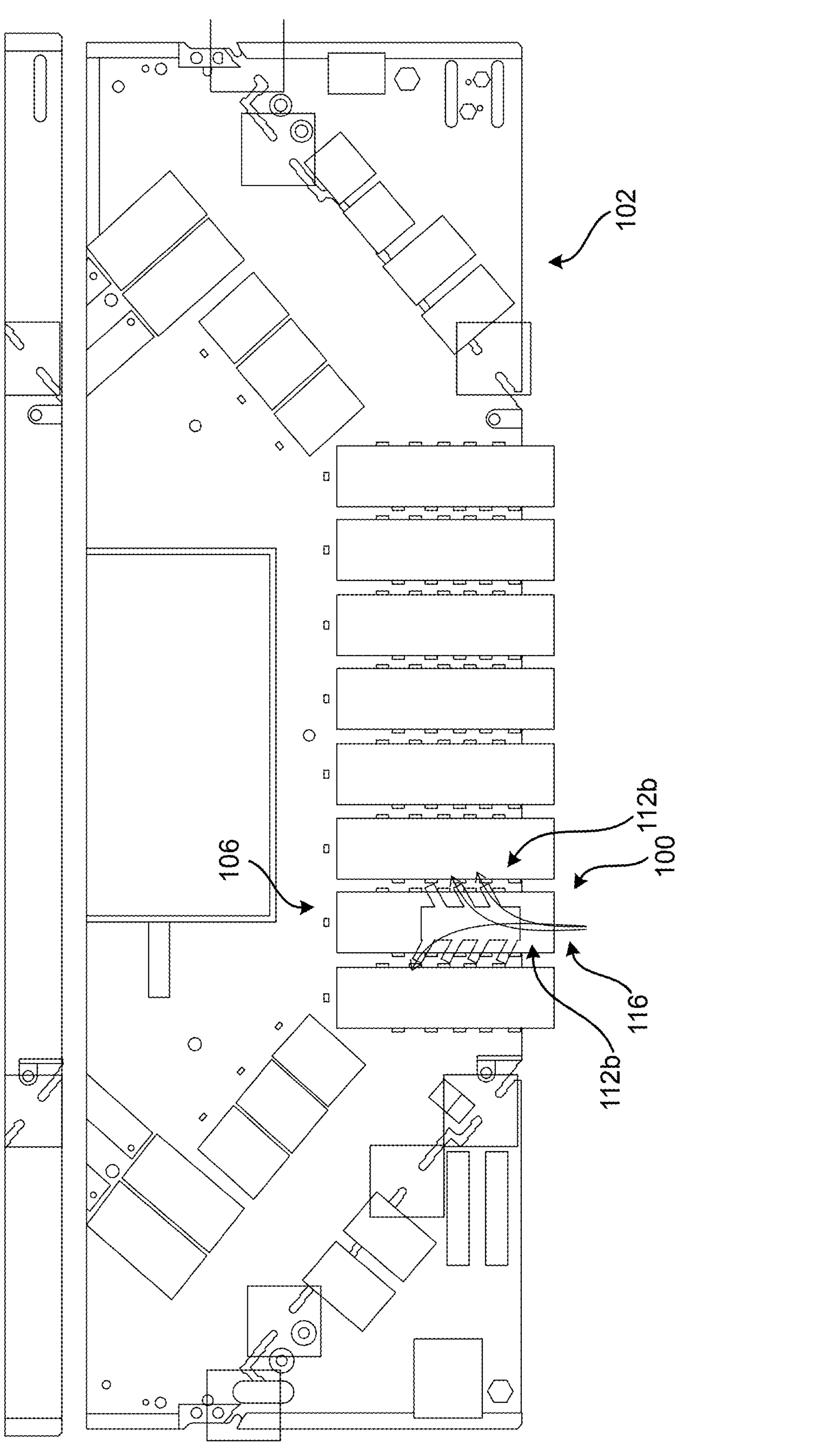
FIG. 7 shows the airflow through one embodiment of the recessed PCB of the POM convection cooling assembly of the present disclosure.

FIG. 7 shows the airflow through one embodiment of the recessed PCB 102 of the POM convection cooling assembly 100 of the present disclosure. The airflow is drawn into the faceplate opening 116 and the main channel 112*a* and through the side channels 112*b*, across the bottom surface of the POM 106.

Figure 8:
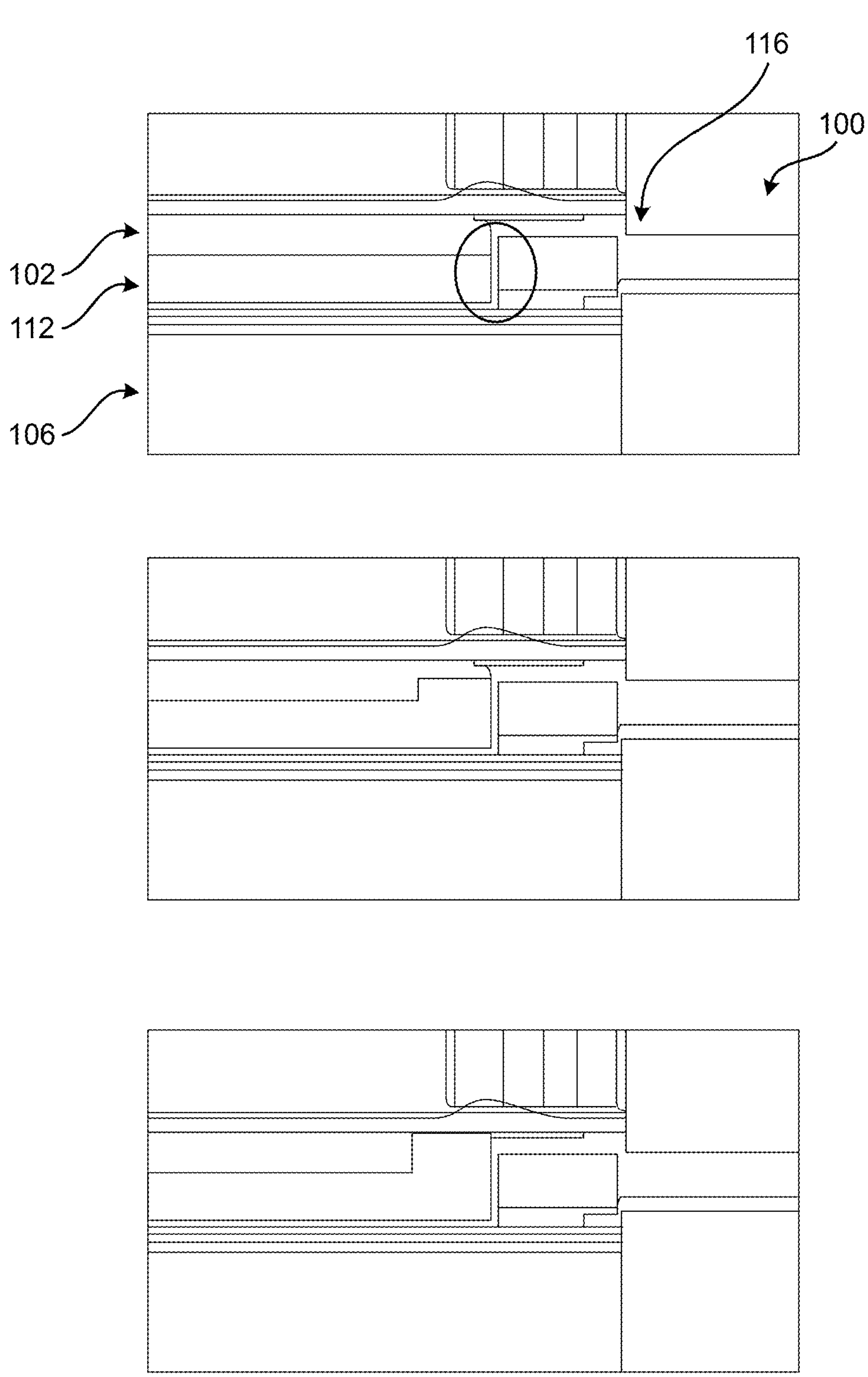
FIG. 8 shows three embodiments of the recessed PCB of the POM convection cooling assembly of the present disclosure, highlighting the alignment of the PCB recess with the faceplate opening.

FIG. 8 shows three embodiments of the recessed PCB 102 of the POM convection cooling assembly 100 of the present disclosure, highlighting the alignment of the PCB recess 112 with the faceplate opening 116. In the first embodiment, one milling depth is used for the recess 112, which is disposed at a different level than the faceplate opening 116, such that the recess 112 acts as a flow constriction at the transition between the faceplate opening 116 and the recess 112. In the second embodiment, two milling depths are used for the recess 112, which is disposed at the same level as the faceplate opening 116, such that the faceplate opening 116 and the recess 112 both act as a flow constriction at the transition between the different depths in the recess 112. In the third embodiment, two milling depths are used for the recess 112, which is more open than the faceplate opening 116, such that the faceplate opening 116 acts as a flow constriction at the transition between the faceplate opening 116 and the recess 112.

Figure 9:
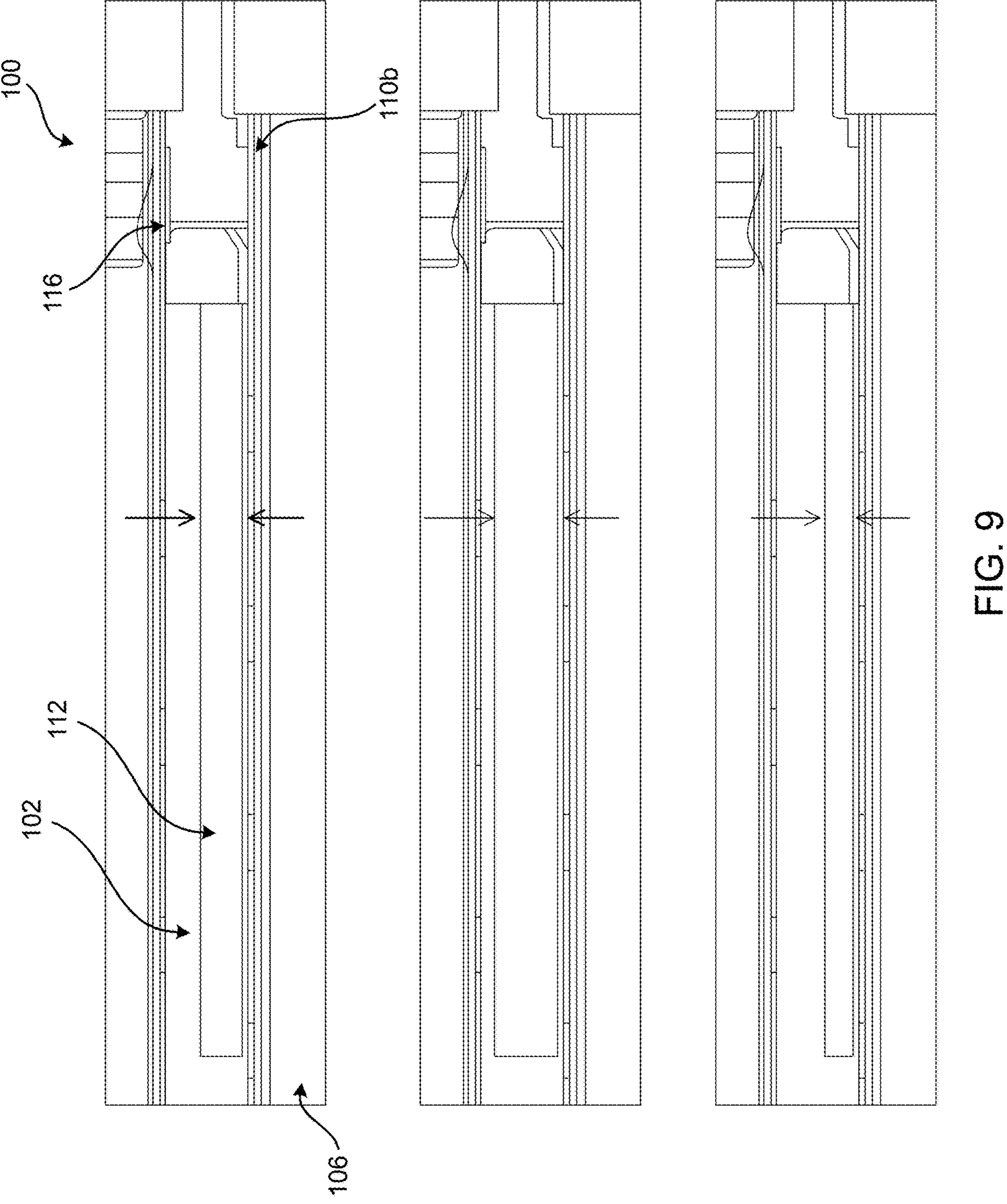
FIG. 9 shows three embodiments of the recessed PCB of the POM convection cooling assembly of the present disclosure, highlighting the depth or thickness of the PCB recess.

FIG. 9 shows three embodiments of the recessed PCB 102 of the POM convection cooling assembly 100 of the present disclosure, highlighting the depth or thickness of the PCB recess 112. In the first embodiment, one milling depth is used for the recess 112 and is half the thickness of the PCB 102. In the second embodiment, one milling depth is used for the recess 112 and is more than half the thickness of the PCB 102. In the third embodiment, one milling depth is used for the recess 112 and is less than half the thickness of the PCB 102. It should be noted that the embodiments illustrated utilize a POM 106 disposed on the secondary side 110*b* of the PCB 102, and thus a secondary-side recess 112.

Figure 10:
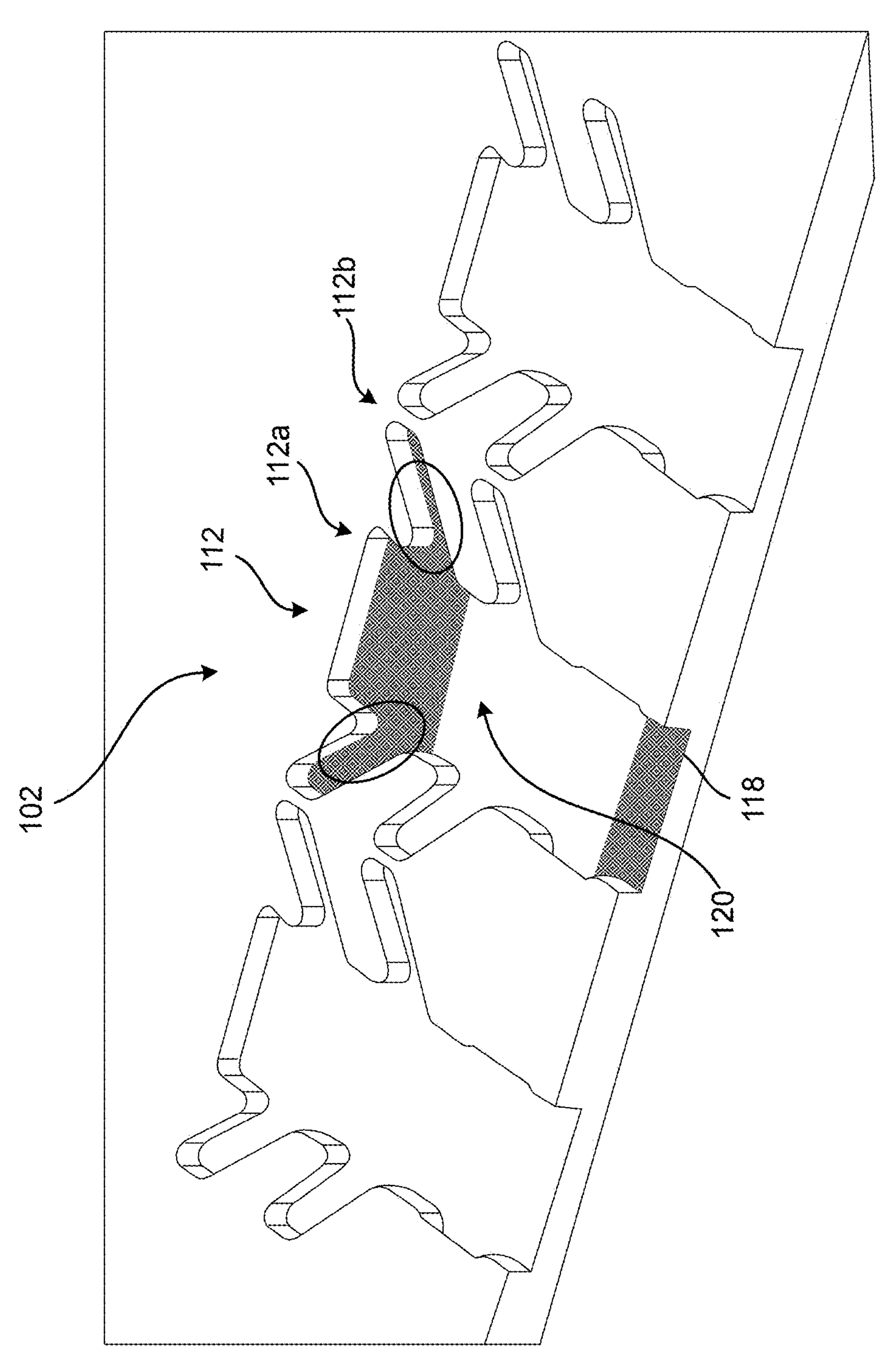
FIG. 10 shows another embodiment of the recessed PCB of the POM convection cooling assembly of the present disclosure, highlighting the use of a PCB recess with a variable depth or thickness.

FIG. 10 shows another embodiment of the recessed PCB 102 of the POM convection cooling assembly 100 of the present disclosure, highlighting the use of a PCB recess with a variable depth or thickness. As illustrated, the main channel 112*a* of the recess 112 utilizes a ramped entrance 118 for conduiting airflow into the main channel 112*a* and the main channel 112*a* and the side channels 112*b* of the recess 112 utilize a widened exit 120 for conduiting airflow out of the main channel 112*a* and the side channels 112*b*. This configuration may reduce expected airflow resistances between the outside of the network element and the inside of the network element, with the more shallow portion of the recess 112 "pushing" the airflow against the case bottom where desired.

Figure 11:
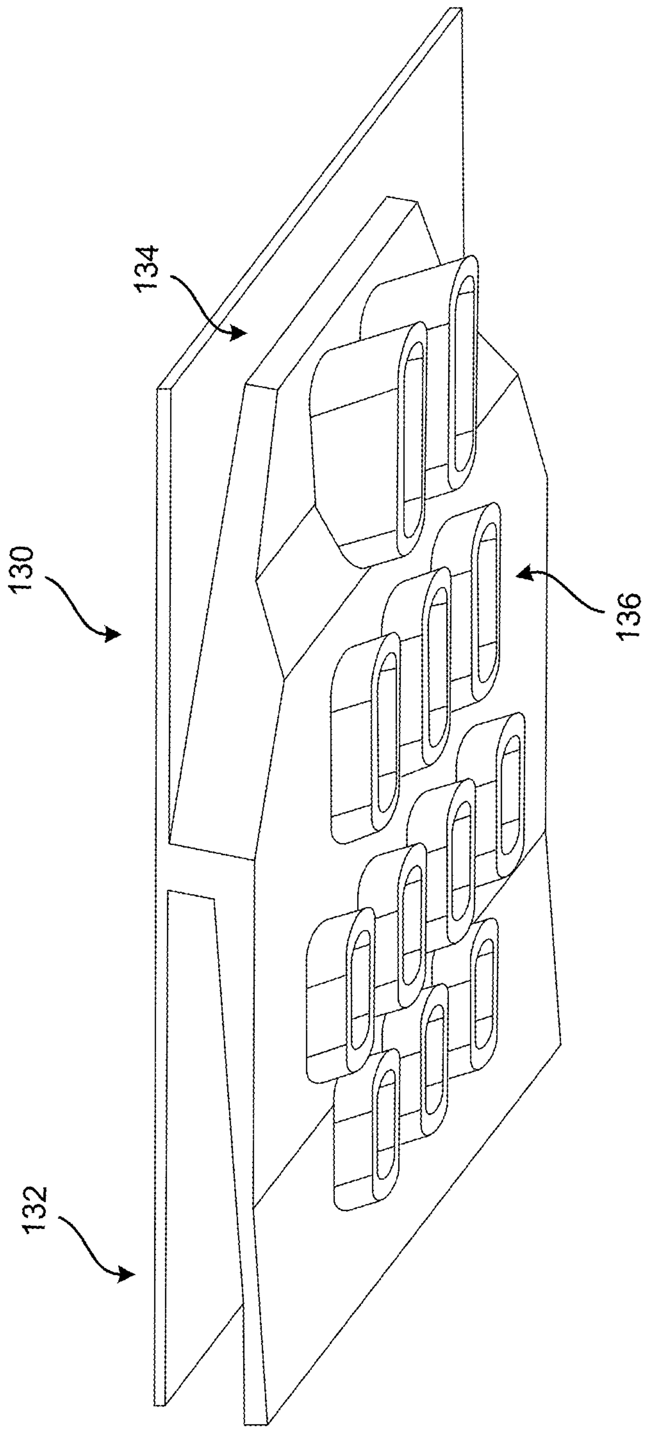
FIG. 11 shows one embodiment of a jet impingement device for use with the POM convection cooling assembly of the present disclosure.
Figure 12:
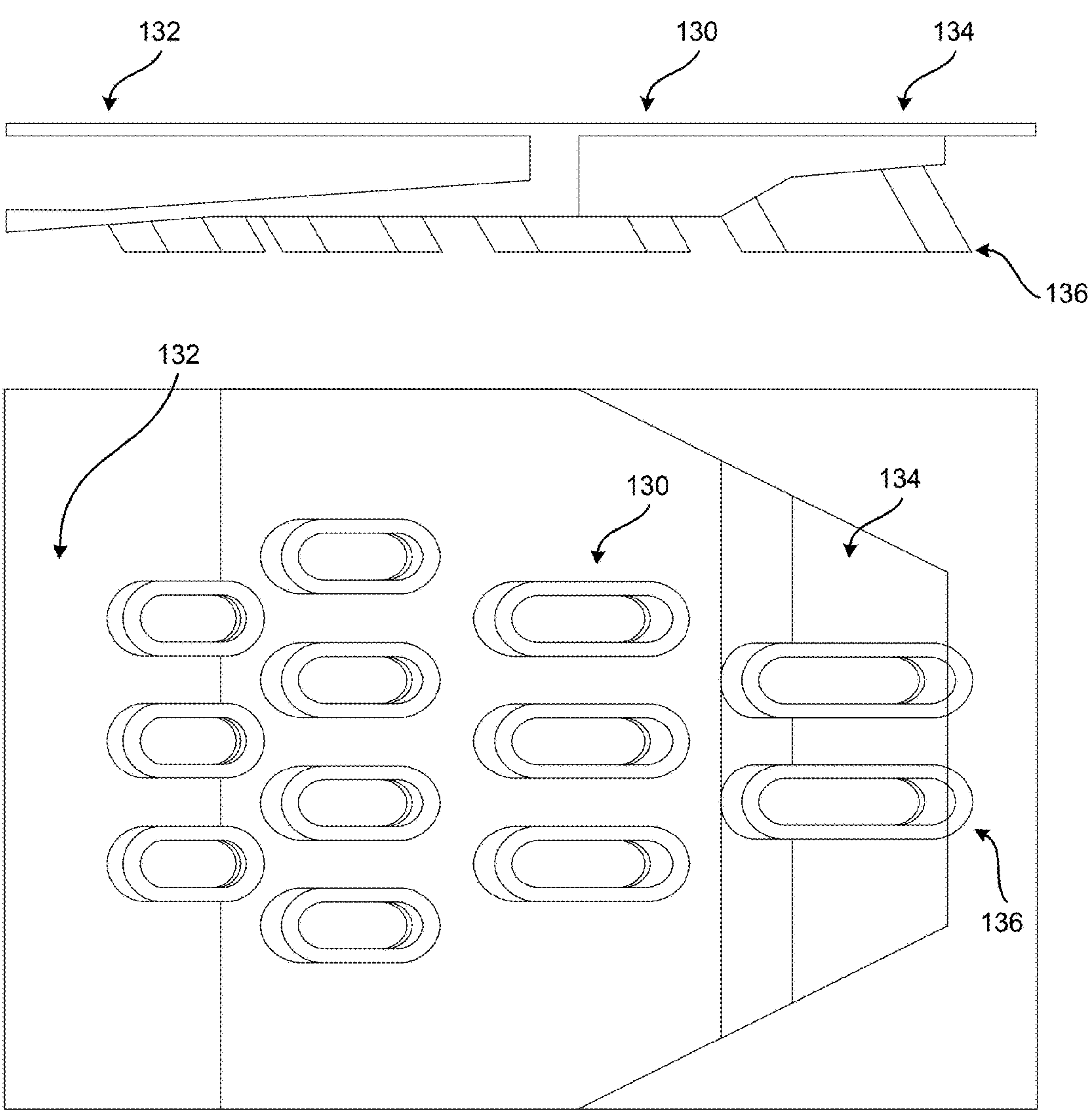
FIG. 12 further shows one embodiment of the jet impingement device for use with the POM convection cooling assembly of the present disclosure.
Figure 13:
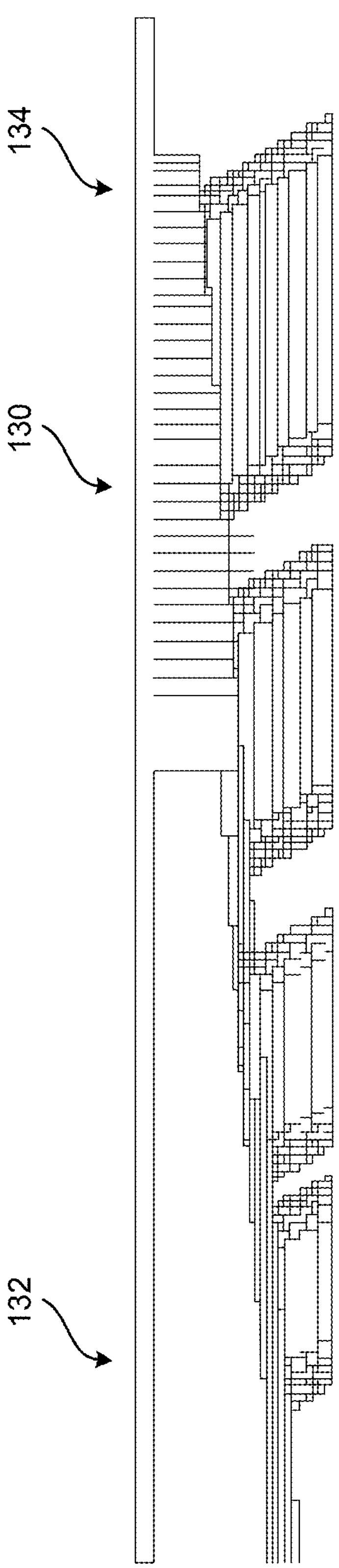
FIG. 13 shows one embodiment of the jet impingement device for use with the POM convection cooling assembly of the present disclosure, highlighting the installation of the jet impingement device in a recess or cutout of the PCB.

FIGS. 11-13 show one embodiment of a jet impingement device 130 for use with the POM convection cooling assembly 100 of the present disclosure. The jet impingement device 130 is configured to be disposed, press-fit, or snapped into the cutout or recess 112 formed in the PCB 102 to better direct the airflow through the cutout or recess 112. As illustrated, the jet impingement device 130 is a molded or 3D printed plastic part or the like that includes a widened entry port 132 and a tapered exit end 134 that collectively serve to direct airflow into the jet impingement device 130 and out of one or more cooling ports 136 directed to the bottom surface of the POM 106. These cooling ports 136 may have graduated individual and collective exit areas from front to back to help equalize airflow from front to back. A secondary-side jet impingement device 130 is illustrated, although it will be readily apparent to those of ordinary skill in the art that cooling ports 136 could alternatively or additionally be provided on the primary side 110*a* as well to cool POMs 106 disposed on both the primary side 110*a* and the secondary side 110*b* of the PCB 102 simultaneously. It should be noted that the insert 104 and the jet impingement device 130 may be implemented as one part.

Figure 14:
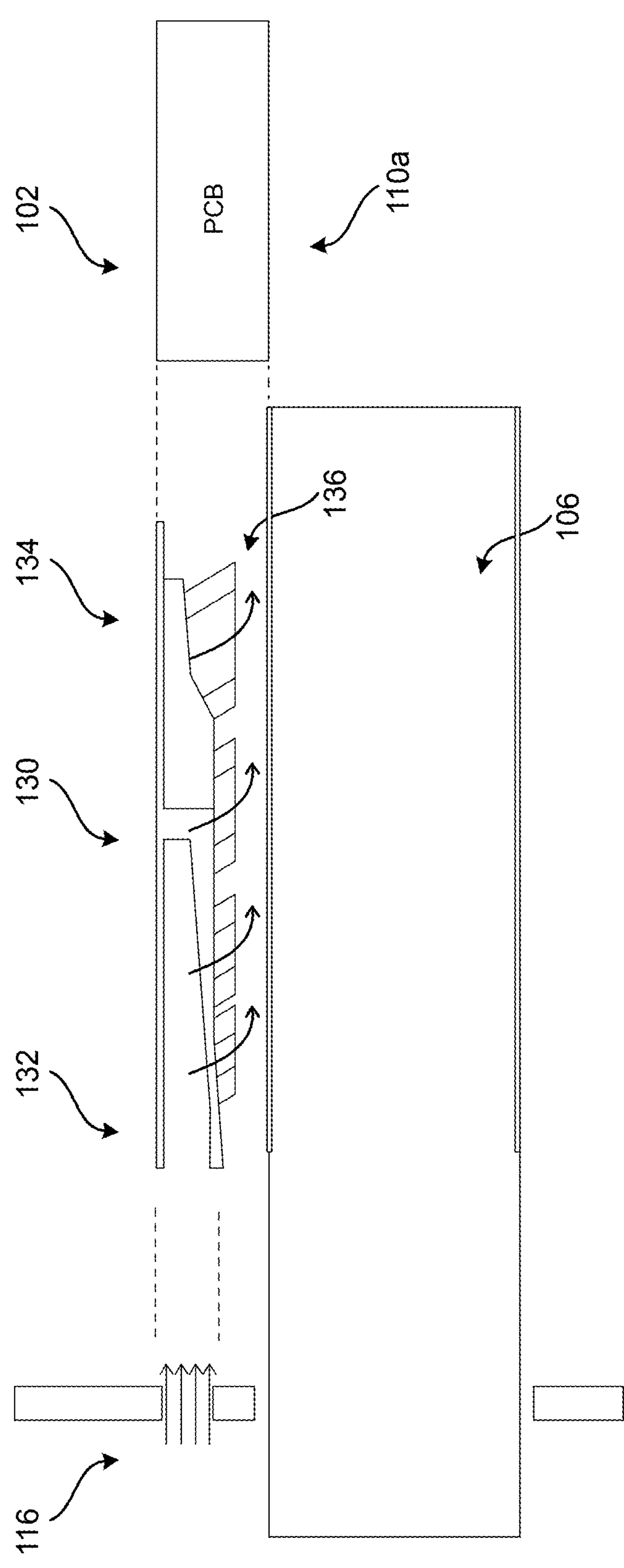
FIG. 14 shows one embodiment of the jet impingement device for use with the POM convection cooling assembly of the present disclosure, highlighting the operation of the jet impingement device cooling a POM case bottom on a secondary side of the PCB.
Figure 15:
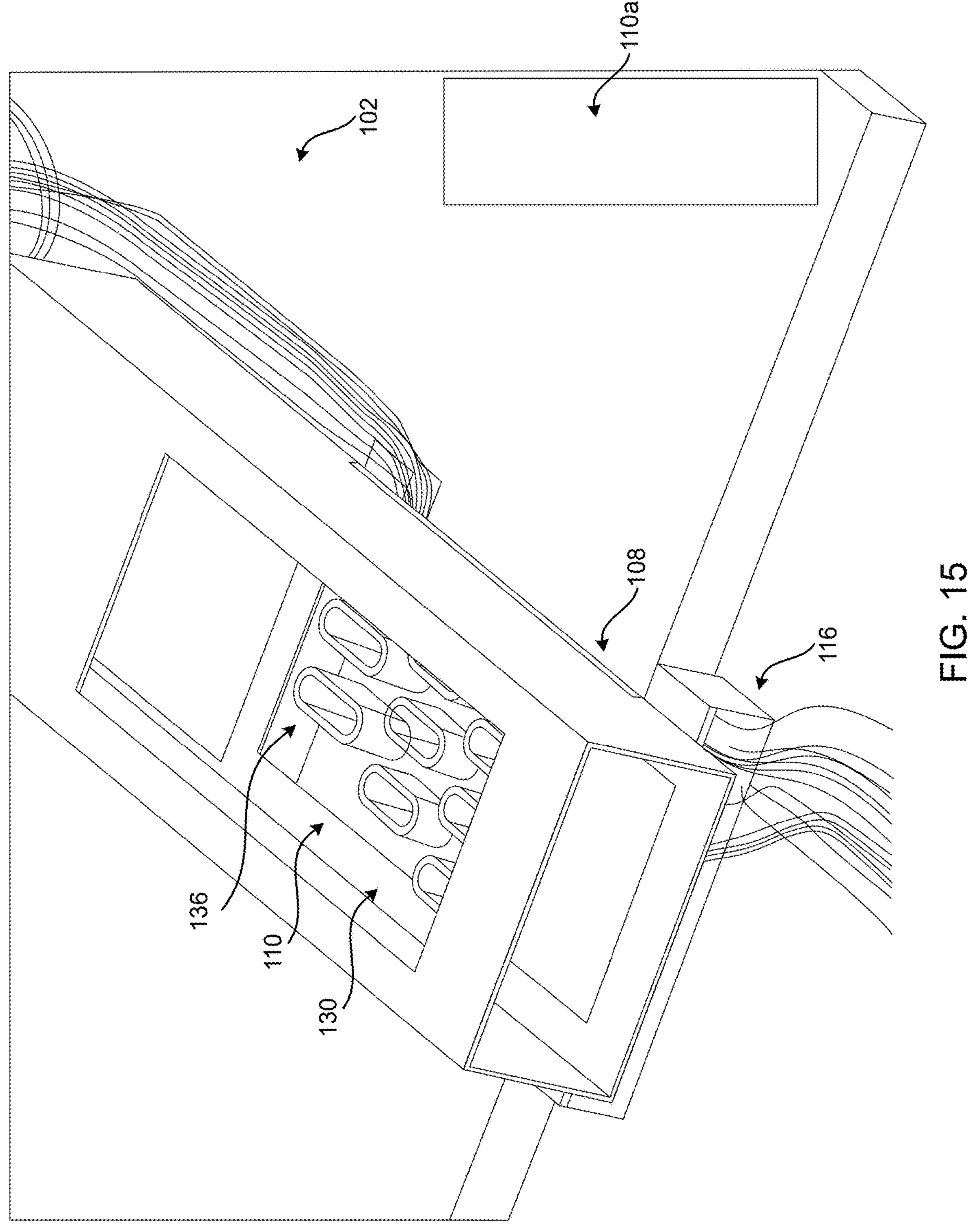
FIG. 15 shows one embodiment of the jet impingement device for use with the POM convection cooling assembly of the present disclosure, highlighting the airflow through the jet impingement device cooling a POM case bottom on a secondary side of the PCB.

FIGS. 14 and 15 show one embodiment of the jet impingement device 130 for use with the POM convection cooling assembly 100 of the present disclosure, highlighting the operation of the jet impingement device 130 cooling a POM case bottom on a secondary side 110*a* of the PCB 102. As illustrated, the airflow is drawn through the faceplate opening 116 and into the high-pressure side 132 of the jet impingement device 130 within the cutout or recess 112 formed in the PCB 102. The airflow is drawn to the low-pressure side 134 of the jet impingement device 130 and directed through the intervening cooling ports 136, potentially with more constriction at the high-pressure end to ensure adequate airflow at the low-pressure end. The cooling airflow is directed out of the cooling ports 136 to the bottom of the POM 106 adjacent to the cutout or recess 112. In this manner, enhanced POM cooling is provided. Note, in FIG. 15, the POM 106 is removed from the POM cage 208 for clarity, and the view primarily faces the secondary side POM 106 on the secondary side of the PCB 102.

Figure 16:
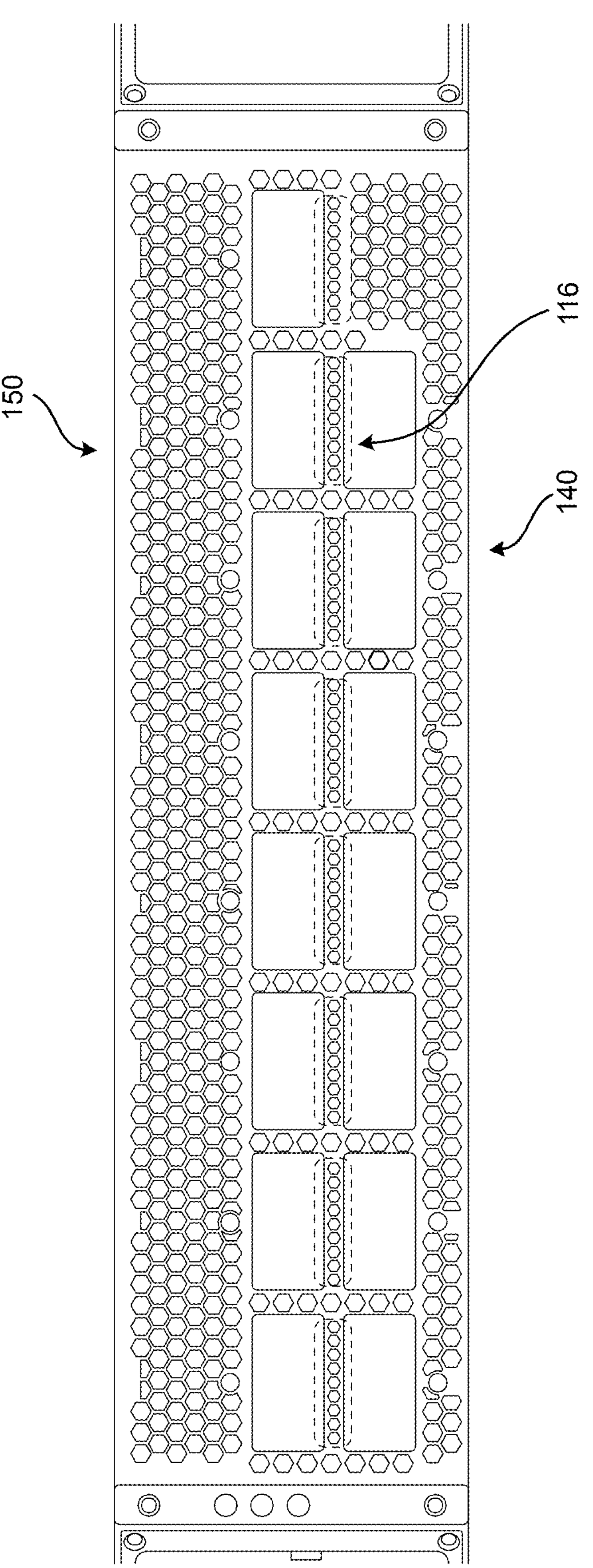
FIG. 16 shows faceplate openings of the POM convection cooling assembly of the present disclosure.

FIG. 16 shows faceplate openings 116 of the POM convection cooling assembly of the present disclosure disposed across the faceplate 140 of the network element. While the geometry of the faceplate openings 116 shown is illustrative, other shapes, sizes, and quantities, are possible; e.g. obround.

Figure 17:
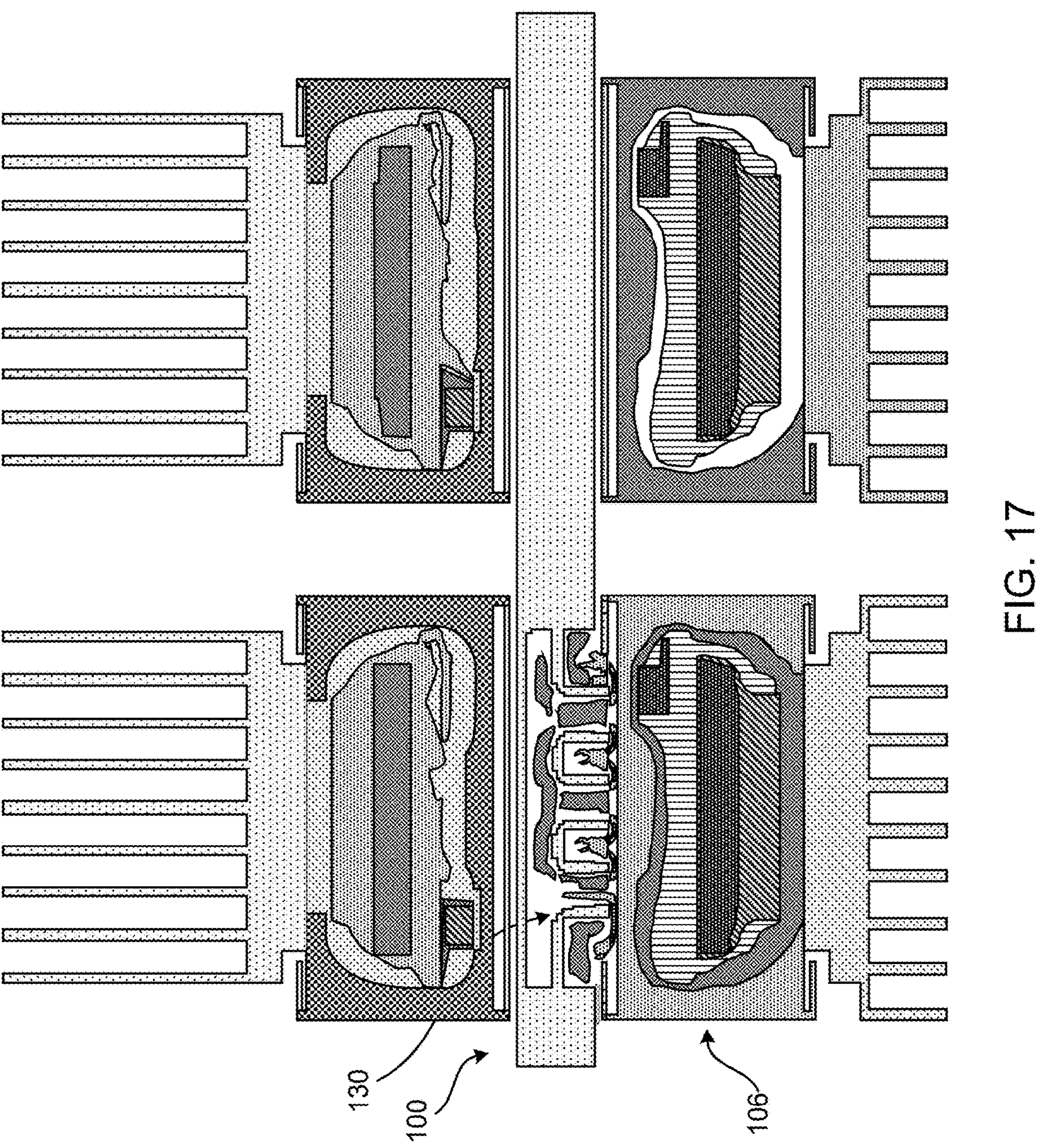
FIG. 17 shows a simulated temperature map showing the temperature reduction for a POM with the convection cooling assembly of the present disclosure.
Figure 18:
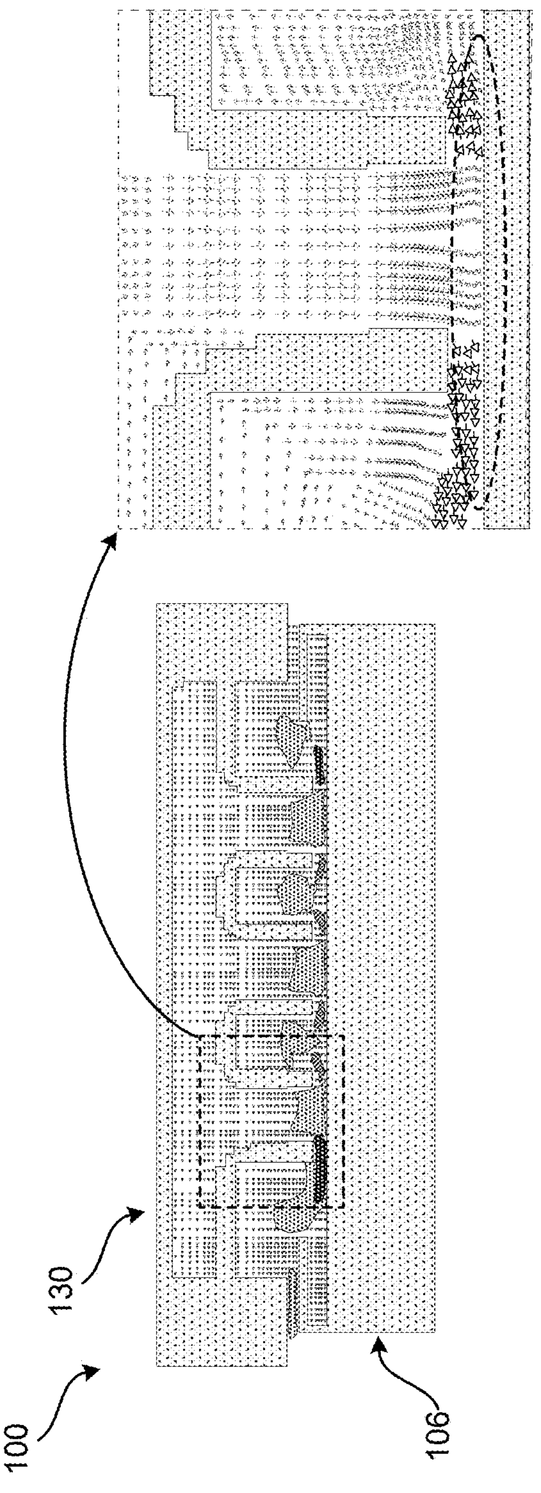
FIG. 18 shows a section view through the jet impingement device, parallel with the faceplate, in which the velocity field is plotted, with attention to the impingement of jets against the case bottom (i.e., belly) of the POM.

FIG. 17 shows a simulated temperature map showing the temperature reduction for a POM 106 with the convection cooling assembly 100 of the present disclosure utilizing jet impingement 130. FIG. 18 shows a section view through the jet impingement device 130, parallel with the faceplate 140, in which the velocity field is plotted, with attention to the impingement of jets against the case bottom (i.e., belly) of the POM 106.

Figure 19:
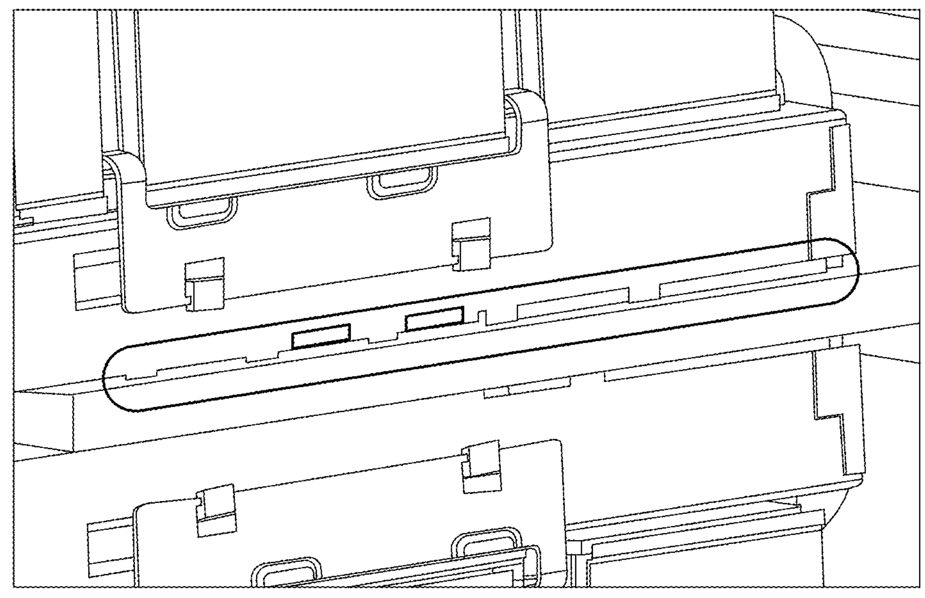
FIG. 19 shows two embodiments of POM cages including cutouts corresponding to the channels of the convection cooling assembly of the present disclosure.
Figure 19:
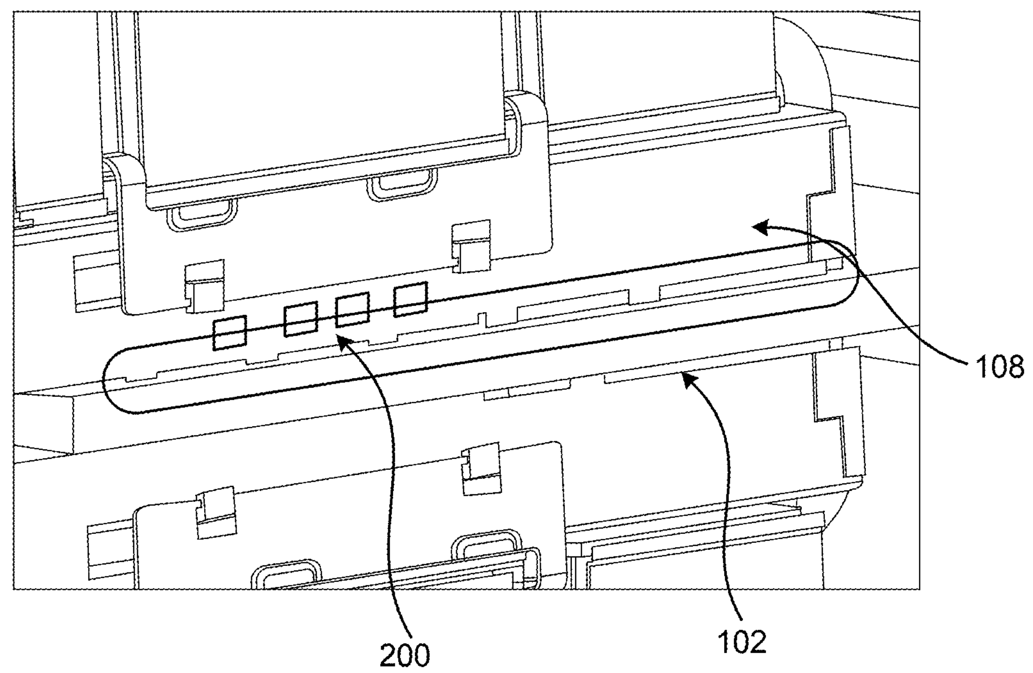

FIG. 19 shows two embodiments of POM cages 108 including cutouts 200 corresponding to the channels **112*b* of the convection cooling assembly 100 of the present disclosure. These cutouts 200 may enhance airflow through the channels 112*b*, out of the POM cages 108**, and toward the rear of the network element.

Thus, again, the present disclosure provides an arrangement of POMs that are positioned belly-to-belly on the primary and secondary sides of a PCB, with secondary-side cooling enabled by selectively removing a volume of the PCB, such that an airflow channel is created under the POM with sufficiently low hydraulic resistance that the channel airflow rate is useful for convectively cooling the POM case bottom. Cuts are made in the faceplate to enable the primarily front-to-back airflow channel. Optional cuts may be made in the POM cage to further improve (i.e. reduce the hydraulic resistance of) the airflow path. With a primarily front-to-rear airflow path provided under the POM, there are different ways to utilize the airflow to convectively cool the POM case bottom. Using a heat sink to bear against a hot surface in the presence of colder moving air is conventional, but through the present disclosure a space exists within the envelope of the PCB (that would otherwise be solid). A jet impingement device may be disposed within this envelope (that would otherwise be solid) to further cool the hot surfaces. This arrangement is especially useful where secondary-side POMs are typically cooled less than primary-side POMs. By enhancing the total cooling of the secondary side POMs, the secondary side POMs become less of a limiting device in the system. Through thermal simulation, it has been determined that at certain ambient conditions and fan speeds (e.g. 40° C. ambient and 40% max fan speed), 4 W of heat can be removed from the POM case bottom, which is associated with a 3-5° C. reduction in POM temperature. This level of reduction is considered significant in the context of POM cooling and presents a competitive advantage. Thus, higher power POMs can be cooled effectively, and liquid-cooling methodologies can be delayed, etc. Increased fan speeds can also be delayed, and fan speed requirements can be reduced, providing less acoustic noise, etc.

As described, the principles and concepts of the present disclosure may be utilized with PCB primary-side POMs, secondary-side POMs, and belly-to-belly POMs arranged vertically top-and-bottom or horizontally side-by-side. The envelope created in the PCB may be a primary-side or secondary-side recess, or may be formed completely through the PCB.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A convection cooling assembly for a pluggable optical module, the convection cooling assembly comprising:

a printed circuit board assembly;

a pluggable optical module cage coupled to the printed circuit board assembly and adapted to receive the pluggable optical module adjacent to the printed circuit board assembly;

wherein the printed circuit board assembly defines a cutout or a recess open to an edge of the printed circuit board assembly and centered within a footprint of the pluggable optical module cage along the edge of the printed circuit board assembly and adapted to be disposed adjacent to a surface of the pluggable optical module when the pluggable optical module is received within the pluggable optical module cage; and a heatsink disposed within the cutout or the recess and adapted to be thermally coupled to the pluggable optical module when the pluggable optical module is received within the pluggable optical module cage, wherein fins of the heatsink are constrained within an envelope defined by the cutout or the recess and do not extend beyond the envelope opposite the pluggable optical module cage.

2. The convection cooling assembly of claim 1, wherein the cutout or the recess is adapted to allow an airflow to pass from the edge of the printed circuit board assembly into the envelope defined by the cutout or the recess, and wherein the cutout or the recess comprises a main channel centered within the footprint of the pluggable optical module cage along the edge of the printed circuit board assembly and one or more side channels disposed orthogonal or at an angle to and extending from the main channel.

3. The convection cooling assembly of claim 2, wherein the main channel is disposed entirely within the footprint of the pluggable optical module cage along the edge of the printed circuit board assembly.

4. The convection cooling assembly of claim 1, wherein the printed circuit board assembly comprises a printed circuit board body and the printed circuit board body defines the cutout or the recess.

5. The convection cooling assembly of claim 1, wherein the printed circuit board assembly comprises a printed circuit board body and a coplanar insert and the coplanar insert defines the cutout or the recess.

6. The convection cooling assembly of claim 1, further comprising a faceplate disposed orthogonal to the printed circuit board assembly and defining an opening aligned with the cutout or the recess.

7. The convection cooling assembly of claim 1, wherein:

the pluggable optical module cage is coupled to a primary side of the printed circuit board assembly; and the printed circuit board assembly defines the cutout or a primary-side recess within the footprint of the pluggable optical module cage and adapted to be disposed adjacent to the surface of the pluggable optical module when the pluggable optical module is received within the pluggable optical module cage on the primary side of the printed circuit board assembly.

8. The convection cooling assembly of claim 1, wherein:

the pluggable optical module cage is coupled to a secondary side of the printed circuit board assembly; and the printed circuit board assembly defines the cutout or a secondary-side recess within the footprint of the pluggable optical module cage and adapted to be disposed adjacent to the surface of the pluggable optical module when the pluggable optical module is received within the pluggable optical module cage on the secondary side of the printed circuit board assembly.

9. The convection cooling assembly of claim 1, wherein:

the pluggable optical module cage coupled to the printed circuit board assembly and adapted to receive the pluggable optical module adjacent to the printed circuit board assembly comprises a primary-side pluggable optical module cage coupled to a primary side of the printed circuit board assembly and adapted to receive a primary-side pluggable optical module adjacent to the primary side of the printed circuit board assembly and a secondary-side pluggable optical module cage coupled to a secondary side of the printed circuit board assembly and adapted to receive a secondary-side pluggable optical module adjacent to the secondary side of the printed circuit board assembly; and the cutout or the recess comprises a cutout through the printed circuit board assembly within the footprint of the primary-side pluggable optical module cage and the secondary-side pluggable optical module cage or a recess formed in the primary side of the printed circuit board assembly within the footprint of the primary-side pluggable optical module cage and a recess formed in the secondary side of the printed circuit board assembly within the footprint of the secondary-side pluggable optical module cage.

10. A network element comprising:

a pluggable optical module;

a faceplate;

a printed circuit board assembly disposed orthogonal to the faceplate;

a pluggable optical module cage coupled to the printed circuit board assembly and adapted to receive the pluggable optical module adjacent to the printed circuit board assembly;

wherein the printed circuit board assembly defines a cutout or a recess open to an edge of the printed circuit board assembly and centered within a footprint of the pluggable optical module cage along the edge of the printed circuit board assembly and adapted to be disposed adjacent to a surface of the pluggable optical module when the pluggable optical module is received within the pluggable optical module cage; and wherein the faceplate defines an opening aligned with the cutout or the recess; and a heatsink disposed within the cutout or the recess and thermally coupled to the pluggable optical module when the pluggable optical module is received within the pluggable optical module cage, wherein fins of the heatsink are constrained within an envelope defined by the cutout or the recess and do not extend beyond the envelope opposite the pluggable optical module cage.

11. The network element of claim 10, wherein the cutout or the recess is adapted to allow an airflow to pass from the edge of the printed circuit board assembly into the envelope defined by the cutout or the recess, and wherein the cutout or the recess comprises a main channel centered within the footprint of the pluggable optical module cage along the edge of the printed circuit board assembly and one or more side channels disposed orthogonal or at an angle to and extending from the main channel.

12. The network element of claim 10, wherein the main channel is disposed entirely within the footprint of the pluggable optical module cage along the edge of the printed circuit board assembly.

13. The network element of claim 10, wherein the printed circuit board assembly comprises a printed circuit board body and the printed circuit board body defines the cutout or the recess.

14. The network element of claim 10, wherein the printed circuit board assembly comprises a printed circuit board body and a coplanar insert and the coplanar insert defines the cutout or the recess.

15. The network element of claim 10, wherein:

the pluggable optical module cage is coupled to a primary side of the printed circuit board assembly; and the printed circuit board assembly defines the cutout or a primary-side recess within the footprint of the pluggable optical module cage and adapted to be disposed adjacent to the surface of the pluggable optical module when the pluggable optical module is received within the pluggable optical module cage on the primary side of the printed circuit board assembly.

16. The network element of claim 10, wherein:

the pluggable optical module cage is coupled to a secondary side of the printed circuit board assembly; and the printed circuit board assembly defines the cutout or a secondary-side recess within the footprint of the pluggable optical module cage and adapted to be disposed adjacent to the surface of the pluggable optical module when the pluggable optical module is received within the pluggable optical module cage on the secondary side of the printed circuit board assembly.

17. The network element of claim 10, wherein:

the pluggable optical module cage coupled to the printed circuit board assembly and adapted to receive the pluggable optical module adjacent to the printed circuit board assembly comprises a primary-side pluggable optical module cage coupled to a primary side of the printed circuit board assembly and adapted to receive a primary-side pluggable optical module adjacent to the primary side of the printed circuit board assembly and a secondary-side pluggable optical module cage coupled to a secondary side of the printed circuit board assembly and adapted to receive a secondary-side pluggable optical module adjacent to the secondary side of the printed circuit board assembly; and the cutout or the recess comprises a cutout through the printed circuit board assembly within the footprint of the primary-side pluggable optical module cage and the secondary-side pluggable optical module cage or a recess formed in the primary side of the printed circuit board assembly within the footprint of the primary-side pluggable optical module cage and a recess formed in the secondary side of the printed circuit board assembly within the footprint of the secondary-side pluggable optical module cage.

18. A convection cooling assembly for a pluggable optical module, the convection cooling assembly comprising:

a printed circuit board assembly; and a pluggable optical module cage coupled to the printed circuit board assembly and adapted to receive the pluggable optical module adjacent to the printed circuit board assembly;

wherein the printed circuit board assembly defines a cutout or a recess open to an edge of the printed circuit board assembly and centered within a footprint of the pluggable optical module cage along the edge of the printed circuit board assembly and adapted to be disposed adjacent to a surface of the pluggable optical module when the pluggable optical module is received within the pluggable optical module cage;

a faceplate disposed orthogonal to the printed circuit board assembly and defining an opening aligned with the cutout or the recess; and a jet impingement device disposed within the cutout or the recess and adapted to receive the airflow through the opening defined by the faceplate and direct the airflow to the surface of the pluggable optical module.

* * * * *